(12) United States Patent
Romano

(10) Patent No.: US 7,017,843 B2
(45) Date of Patent: Mar. 28, 2006

(54) HAND-HELD FOOD PROCESSOR

(76) Inventor: John J. Romano, 240 W. Third Ave., Conshohocken, PA (US) 19428

( * ) Notice: Subject to any disclaimer, the term of this patent is extended or adjusted under 35 U.S.C. 154(b) by 46 days.

(21) Appl. No.: 10/647,546

(22) Filed: Aug. 25, 2003

(65) Prior Publication Data

US 2005/0045755 A1  Mar. 3, 2005

(51) Int. Cl.
*A47J 43/25* (2006.01)

(52) U.S. Cl. .................. 241/169; 241/94; 241/168; 241/273.1

(58) Field of Classification Search .............. 241/94, 241/95, 168, 169, 273.1, 273.2
See application file for complete search history.

(56) References Cited

U.S. PATENT DOCUMENTS

| | | | | |
|---|---|---|---|---|
| 203,767 A | * | 5/1878 | Pierson | 241/84.4 |
| 751,159 A | * | 2/1904 | Gage | 241/169 |
| 774,217 A | * | 11/1904 | Welke | 241/273.1 |
| 6,409,107 B1 | * | 6/2002 | Romano | 241/94 |

* cited by examiner

*Primary Examiner*—Derris H. Banks
*Assistant Examiner*—Jason Y. Pahng
(74) *Attorney, Agent, or Firm*—Armand M. Vozzo, Jr.

(57) ABSTRACT

An improved hand-held food processor for performing selected cutting operations upon a foodstuff is disclosed comprising an elongated housing, a lever arm extended substantially through the housing and pivotally coupled thereto under a spring bias, and a processing plate containing a cutting panel slidably disposed and adapted to engage the pivoting lever arm at its lower tip to provide reciprocating cutting motion. The housing is formed having a narrow grip-like upper section for handling and an expanded bell-shaped lower section with an open bottom at the base of the housing. The lower section of the housing is further formed having a forward compartment intended to hold the foodstuff to be processed. A spring-driven press mechanism is slidably mounted within the forward compartment of the housing and releasably engaged for activation to push the foodstuff through the compartment and onto the reciprocating plate for delivery of processed foodstuff.

19 Claims, 7 Drawing Sheets

HAND-HELD FOOD PROCESSOR

BACKGROUND OF THE INVENTION

The present invention relates generally to food processing devices, and more particularly to an improved hand-held food processor capable of cutting, slicing, shredding or grating foodstuffs loaded into a compartment and fed automatically there through by a releasable spring-driven press mechanism that is activated during operation to facilitate handling and manipulation of the processor by the user.

Food processing devices that can cut, slice, grate and shred food have become a staple product in the household as a sensible and timesaving alternative to manual food preparation. These food processing devices appear in a variety of shapes and sizes with many of them being electrically powered, either by cord connection to an electrical outlet or by a self-contained power supply. In recent times, electrical mini-processors have been developed that are more powerful yet more compact than their predecessors. While these mini-processors have been easier to use and less cumbersome, they are generally designed for stationary use and not for portable, hand-held operation. Because of their characteristic portability, general convenience and stand-by readiness, hand-held food processors, even though typically less powerful than the stationary food processing devices, continue to find favor with consumers in their food preparation activities.

Numerous hand-held devices have been devised for performing any or all of the processing operations of cutting, slicing, grating or shredding of foodstuffs, such as vegetables, fruits and cheeses. One example of a most recent hand-held food processor is that shown and described in U.S. Pat. No. 6,409,107 (Romano) wherein the foodstuff to be processed is loaded into a hollow cavity and pushed down and onto a reciprocating cutting blade by the gripping and squeezing action of the user upon a handle-like pusher and an actuator lever pivotally connected thereto. This completely manually-powered device is particularly lightweight and easy to handle but limited, to a certain extent, in the capacity of its hollow cavity and in the amount of foodstuffs that can be loaded into the cavity and processed effectively at any one time using the normal gripping span of the user's hand. Other types of prior art hand-held food processors having self-contained electrical power units with associated motors that drive rotatable cutting blades, such as those devices shown and described in U.S. Pat. No. 4,856,718 (Gaber et al.) and U.S. Pat. No. 5,364,037 (Bigelow), effectively process and deliver sliced, shredded or grated foodstuff, as selected, from whole stock loaded into the processors. However, these and other electrically powered devices tend to be larger and heavier in size, becoming more difficult to handle and manipulate, particularly with one hand, and further rely on battery units to power their motor drives that can discharge rapidly and require frequent replacement or recharging.

While these and other prior art hand-held food processors may be suitable for their general purposes, there is still a need for improvements in the ease and effectiveness of the loading and delivery of the foodstuffs to be processed as well as in facilitating the handling and manipulation of such food processors by the consumer user.

SUMMARY OF THE INVENTION

Accordingly, it is a general purpose and object of the present invention to provide an improved hand-held food processor for cutting, slicing, shredding or grating of various foodstuffs.

A more particular object of the present invention is to provide an improved food processing device that can be effectively operated by hand to cut, grate or shred a variety of foodstuff in a wide range of sizes and deposit the foodstuff in processed form at the location desired by the user.

Another object of the present invention is to provide a hand-held food processor that is completely portable and easy to handle and manipulate during its operation.

Still another object of the present invention is to provide a hand-held food processor that is lightweight and easy to use and effective in its operation without need for electrical power.

A still further object of the present invention is to provide a hand-held food processor that is simple in construction yet reliable in its operation and that is configured for easy storage.

Briefly, these and other objects of the present invention are accomplished by an improved hand-held food processing device for selectively slicing or grating a foodstuff comprising an elongated housing, a lever arm extended substantially through the housing and pivotally coupled thereto under a spring bias, and a processing plate containing a cutting panel slidably disposed at the base of the housing and adapted to engage the pivoting lever arm at its lower tip to provide reciprocating motion relative to the housing. The housing is formed having a narrow grip-like upper section for handling and an expanded bell-shaped lower section with an open bottom at the base of the housing. The lower section of the housing is further formed having a forward compartment intended to hold the foodstuff to be processed. A spring-driven press mechanism is slidably mounted within the forward compartment of the housing and releasably engaged for activation to push the foodstuff through the compartment and onto the reciprocating plate for delivery of processed foodstuff from the base of the housing. The processing plate is adapted to hold different types of cutting panels to process the foodstuff in various forms.

For a better understanding of these and other aspects of the present invention, reference should be made to the following detailed description taken in conjunction with the accompanying drawings in which like reference numerals and characters designate like parts throughout the figures thereof

BRIEF DESCRIPTION OF THE DRAWINGS

For a fuller understanding of the nature and object of the present invention, references in the detailed description of the preferred embodiment set forth below shall be made to the accompanying drawings in which.

DETAILED DESCRIPTION OF THE INVENTION

Figure 1:
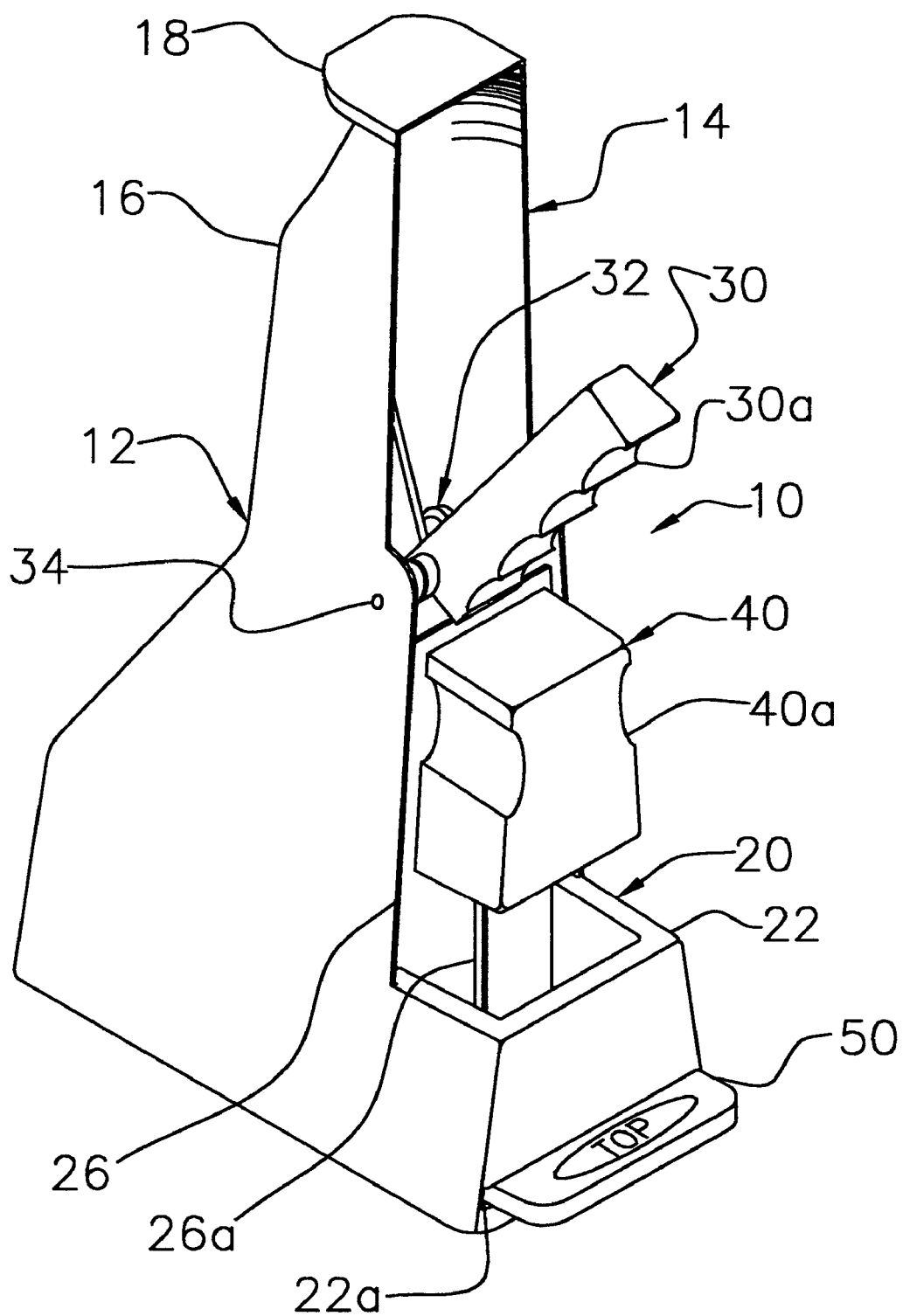
FIG. 1 is a front perspective view of a food processor device made in accordance with the present invention.

The following is a detailed description of a preferred embodiment of the present invention and the best presently contemplated mode of its production and practice. This description is further made for the purpose of illustrating the general principles of the invention but should not be taken in a limited sense, the scope of the invention being best determined by reference to the appended claims.

Referring now to the various figures of the drawing, there is shown a hand-held food processor device, generally designated 10, constructed in accordance with the present invention. The present device 10 is arranged and adapted to slice, grate or otherwise cut off portions from an article of foodstuff designated 52 in FIG. 9 (e.g. cheese, garlic, nuts, fruit, vegetables, meat, etc.) that can be cut or otherwise reduced in portions. As will be described in detail in the discussion to follow, the exemplary embodiment of the present food processor device 10 is a lightweight and portable unit that includes a removable processing plate member 50 containing a cutting panel 52, best viewed in FIG. 7, that is slidably mounted within the device and made to move in a reciprocating fashion to cut, slice or grate the foodstuff. Depending upon the shape and configuration of the cutting panel 52, the present food processor device 10 can slice the foodstuff 54 into one or more relatively thin slices or slabs, or can "grate" the foodstuff into a plurality of smaller pieces. In discussing the present device 10, the term "slice" (or variants of that word) will be used to denote the formation of a single cutting or piece from the foodstuff 54 upon a single movement or "pass" of the cutting panel 52, whereas the term "grate" (or variants of that word) will be used to denote the formation of plural cuttings from the foodstuff upon a single movement or pass of the cutting panel across the foodstuff. However, it must be appreciated that the cutting panel 52 can be constructed to produce plural slices in a single pass, so that the terms slice and grate can overlap to some degree.

Figure 2:
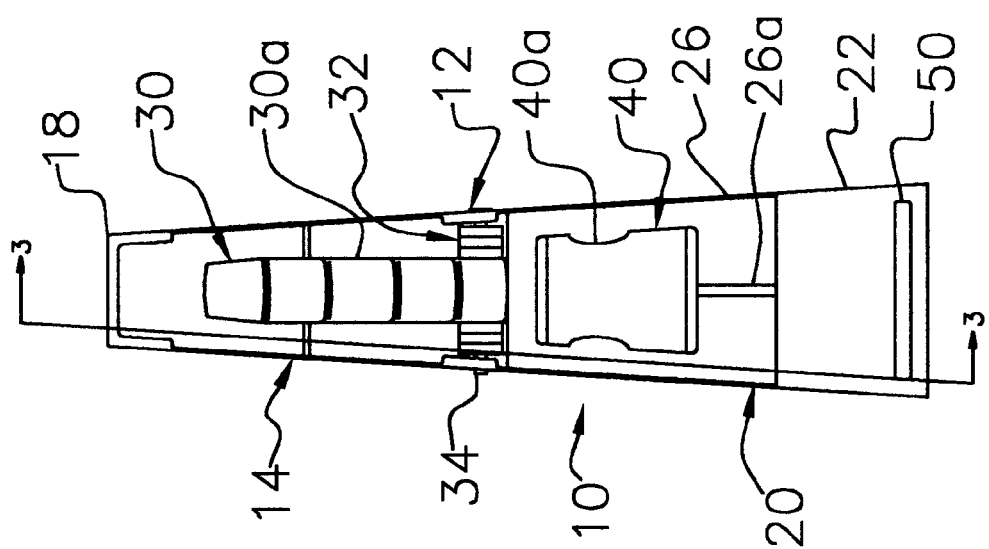
FIG. 2 is a front elevation view of the food processor device shown in FIG. 1.

Referring now particularly to FIGS. 1 and 2, the present food processor device 10 is shown standing in a normal vertical attitude as the device would be stored or otherwise positioned on a shelf or countertop (not shown) in a kitchen area or like place where food is prepared. The present food processor device 10 comprises an elongated housing 12 of plastic or other lightweight yet durable material that is formed in a rigid shell-like body, as described in greater detail below, that can support the mounting of various components of the device and facilitate its intended hand-held operation. The housing 12 is a thin-walled body having a substantially hollow chamber that extends through the housing between a contoured upper section 14 having a reduced cross section to allow easy handling by the user and an expanded lower section 20 to accommodate the processing of food within the device 10. The upper section 14 of housing 12 is open along its front end and formed having a surrounding handle surface 16 ergonomically shaped in a U-shaped configuration to fit the palm of the hand. A cap member 18 is further attached at the top of the upper section 14 extending across and over the handle surface 16 to provide a ledge-like surface that facilitates gripping along the top of the housing 12 and maintains the user's hand in proper position to manipulate the food processor device 10 during operation.

Figure 3:
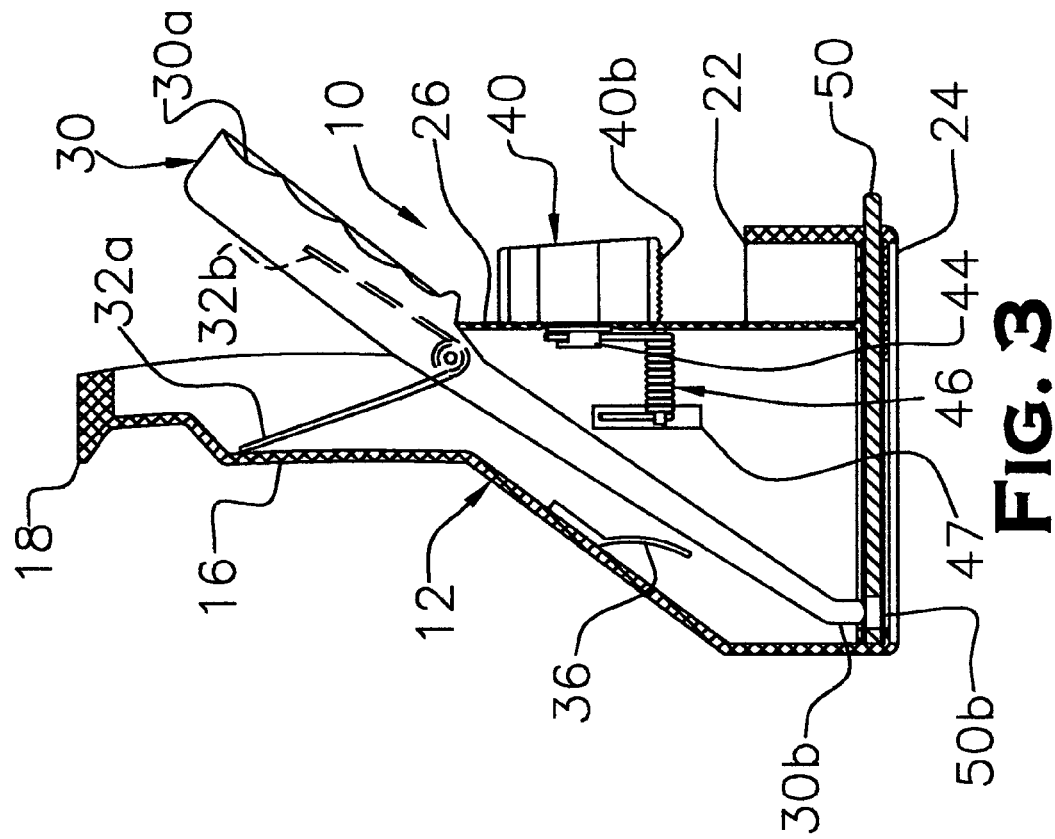
FIG. 3 is a sectional view of the food processor device taken along line 3—3 of FIG. 2.

The lower section 20 of the housing 12 is expanded in both dimensions, front-to-back and side-to-side, relative to the upper section 14, the increase in front-to-back dimension being most prominent, as better seen in FIG. 3, so that the housing profile reflects somewhat of a bell-shaped configuration. A forward compartment 22 projects from the bottom of lower section 20, having a pair of sidewalls and a front wall formed in a rectangular arrangement at the base of housing 12. The top and bottom of the forward compartment 22 are both open to allow foodstuff being processed to be fed into the compartment from above and discharged in a processed state from the bottom of the compartment. A slotted opening 22a provided across the front of the forward compartment 22 near its base allows for insertion of the processing plate 50 into the bottom of housing 12 and for the reciprocating passage therethrough in accordance with the operation of the present food processor device 10.

Figure 4:
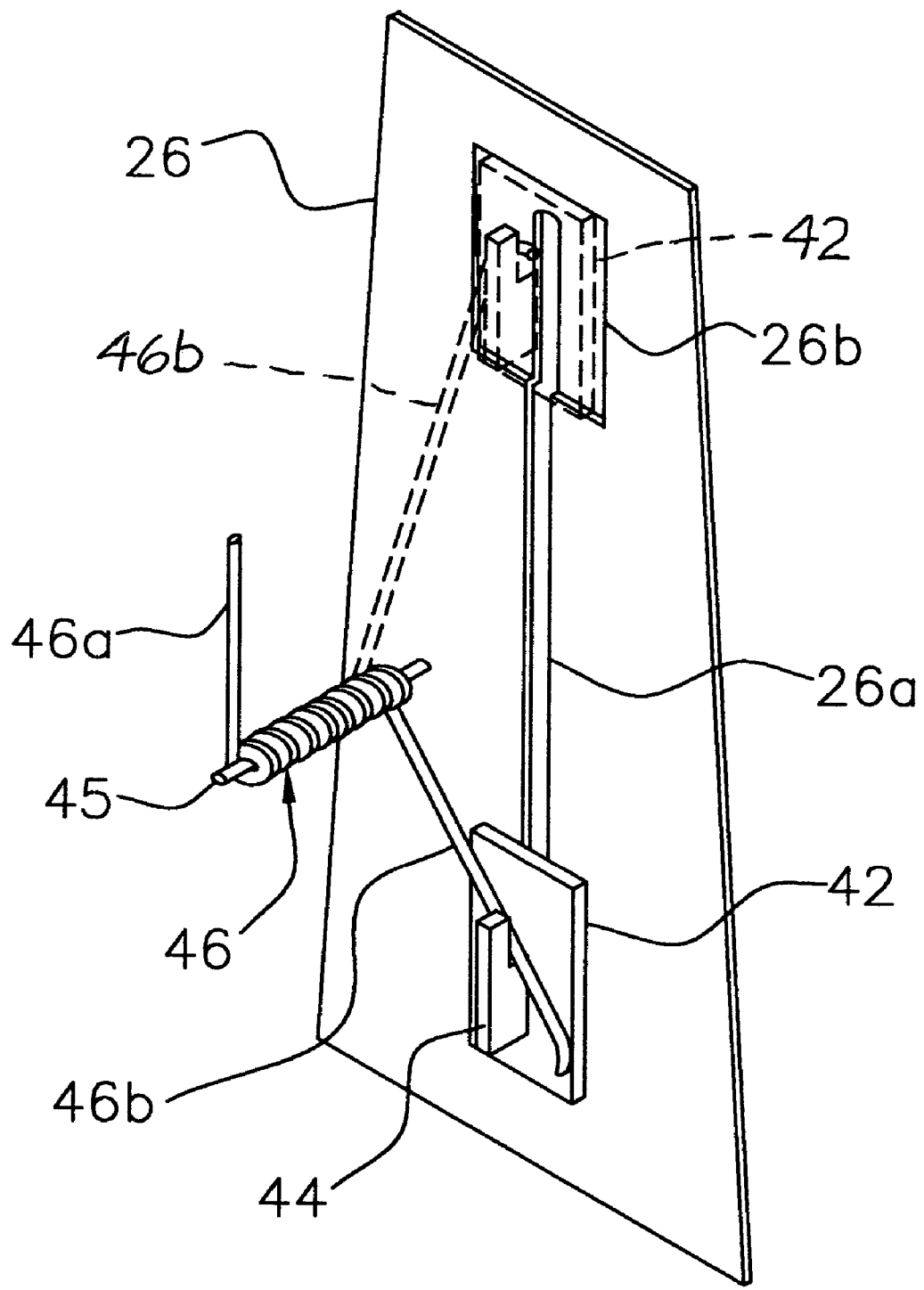
FIG. 4 is forward isometric view of a portion of the internal structure of the food processor device of FIG. 1, particularly showing the internal coupling of the press mechanism associated with the present invention.

A panel member 26, made of a thin yet rigid material, is vertically disposed and secured within the lower section 20 of housing 12 along the front edge thereof. This front panel member 26 is positioned so that it passes through the rearward edge of the forward compartment 22 thereby establishing a rear wall surface for the forward compartment. The front panel member 26 is further provided with a slot 26a formed longitudinally therethrough in a central position relative to the width of the panel. Slot 26a and other associated openings formed on the rear side of the panel member 26, as best shown in FIG. 4 and described below in greater details, serve to direct the vertical movement of a spring-driven press head 40 along the front panel member 26 and through the forward compartment 22 in operation of the food processor device 10. An elongated lever arm 30 having a grip-like head 30a is pivotally mounted to the housing 12 and adapted to extend substantially through the housing chamber secured upon a pivot rod 34 that is connected between the side walls of the housing just above the top of front panel member 26. The lever arm 30 is further coupled to the upper section 14 of housing 12 by a torsion spring 32 that biases the grip head 30a of the lever arm outward from the open front end of the housing so that a squeezing action upon the grip head will cause the lever arm to rotate about pivot rod 34 and move through the chamber in a reciprocating fashion. As described below in greater detail, this rotational movement of the lever arm 30 serves to produce and control the reciprocating passage of the processing plate 50 through the bottom of forward compartment 22.

Figure 5:
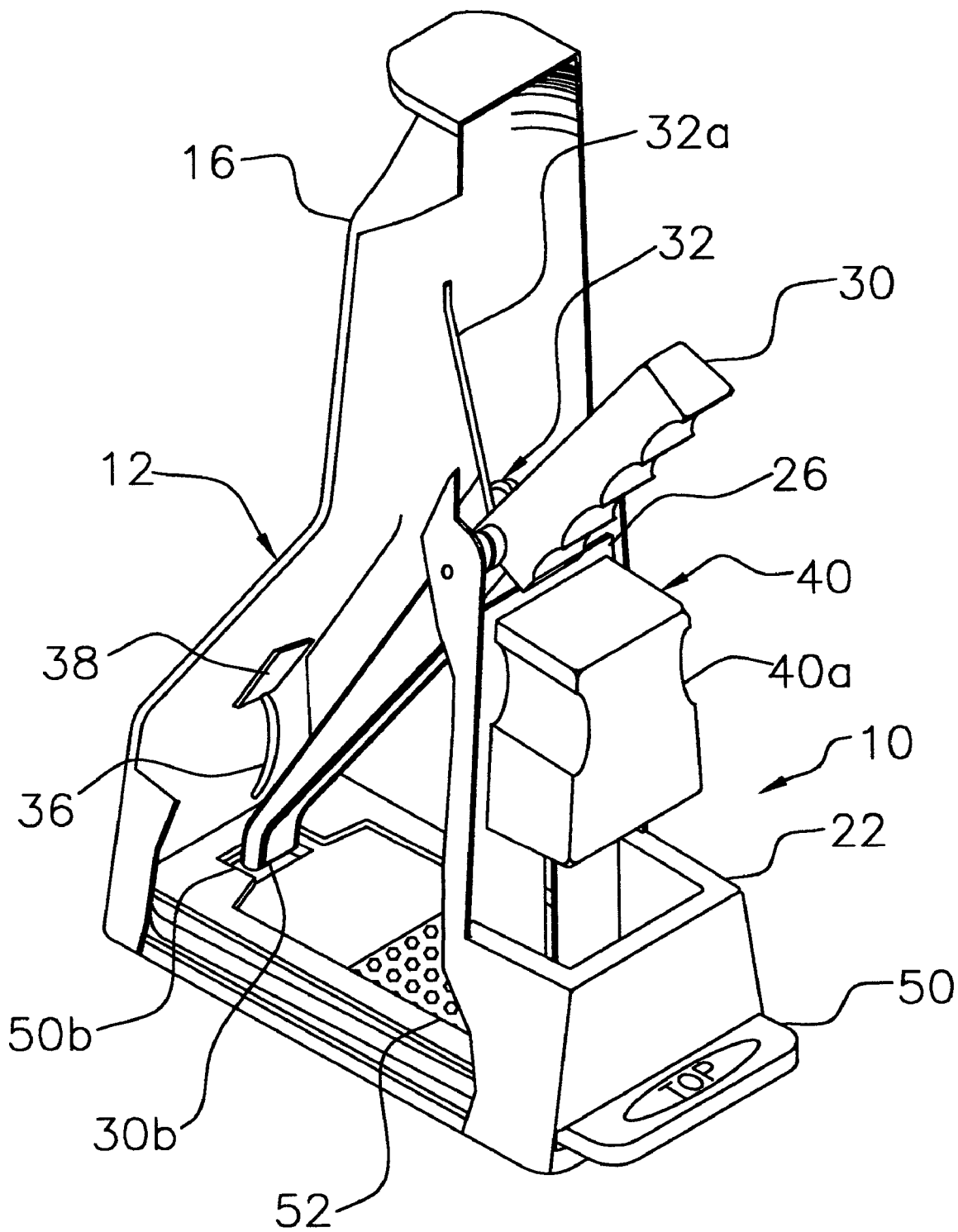
FIG. 5 is a front perspective view, similar to that of FIG. 1, but partially cutaway to show the internal arrangement of parts of the present food processor device.

Referring now to FIGS. 3 and 5 in conjunction with FIGS. 1 and 2, the lever arm 30 extends in length downward from grip head 30a in the form of a substantially flat rod section that passes backward and through the expanded lower section 20 of the housing 12 at an inclined attitude so that the rod section is made to extend substantially parallel to the inclined rear surface of the lower section when the lever arm is stationed in its normal spring-biased position. A tapered tip portion 30b is further provided at the bottom of the lever arm 30 and made to curve downward at an angle relative to the flat rod section so that the tip portion is directed at and substantially perpendicular to the bottom of housing 12. The torsion spring 32 is a conventional coiled spring body further having a pair of extended legs 32a and 32b that project from either end to apply the torque developed by the coiled body under torsion between the lever arm 30 and housing 12. One of the extended legs 32a projects rearward from the body of torsion spring 32 as it is mounted along pivot rod 34 to engage upon and press against the inside wall of the handle surface 16 of upper section 14 while the other extended leg 32b is made to project forward from the opposite end of the coiled body of torsion spring 32 to engage upon and press against the inside surface of the grip head 30a. This positional arrangement of the extended legs 32a, 32b of torsion spring 32 and their pressing engagement between the grip head 30a and upper section 14 of the housing 12 serves to spring-load the lever arm 30 upon pivot rod 34 with a bias that urges the grip head 30a forwardly and outwardly from the front end of the upper section at an acute angle relative thereto. Squeezing forces, therefore, applied by hand between the grip head 30a and the handle surface 16 of the housing serve to rotate the lever arm 30 back and forth about the pivot rod 34 and move the lower part of the lever arm and its tapered tip portion 30b radially in a reciprocal fashion through the chamber of the lower section 20 of the housing.

Figure 7:
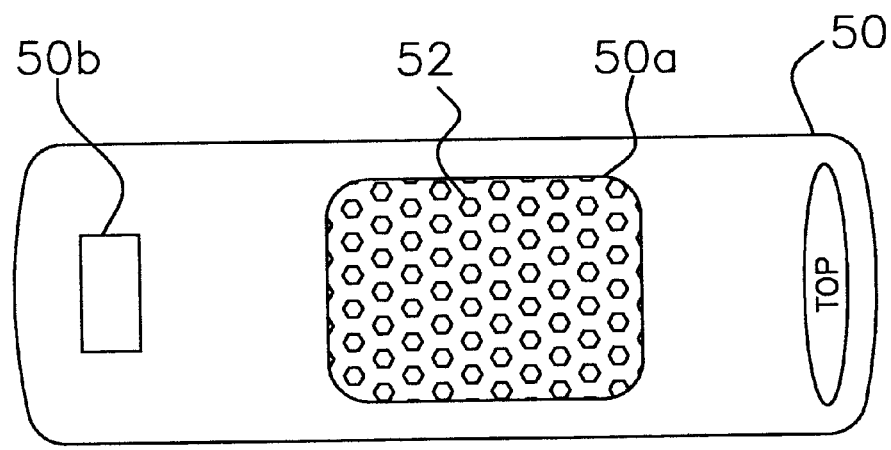
FIG. 7 is a top plan view of an associated processing plate used in the food processor device of FIG. 1 shown removed therefrom.

The processing plate 50 inserted within the slot 22a at the bottom of housing 12 is slidably contained therein and movable in a plane substantially parallel to the base of the housing. Referring to FIG. 7 for a better view of the processing plate 50, the body of the plate is a rigid planar member, typically made of a plastic material, that is formed to provide a central opening 50a into which a cutting panel 52 having sharp-edged perforations formed across its surface is internally fitted and secured. The cutting panel 52 is made from a thin planar sheet of corrosion resistant metal, such as, for example, stainless steel, or some other hard material capable of providing the sharp-edged perforations. The processing plate 50 is preferably molded in its entirety with the cutting panel 52 embedded therein and contained within the central opening 50a. Alternatively, the processing plate 50 may be laminated in construction comprising separate top and bottom planar halves, each having respective central openings 50a, secured together about the cutting panel 52. A separate keyway opening 50b is further provided and formed through the processing plate 50 near to the rear edge of the processing plate. The keyway opening 50b is aligned longitudinally with the central opening 50a but relatively smaller than the central opening and more rectangular in its configuration. As described below in greater detail, the keyway opening 50b is designed and positioned to engage the tapered tip portion 30b of lever arm 30 as it moves in a radial course through the lower section 20 of housing 12 thereby causing longitudinal motion to be imparted to the slidable processing plate 50.

The processing plate 50 is made slidable and guided in a longitudinal direction by means of fitted containment within the slotted opening 22a of the forward compartment 22 and further through the base of housing 12 along the inside walls thereof to the back surface thereof. As may be seen in FIG. 5, separate tracks 12a that are spaced apart and made to extend along opposite walls of the housing 12 project inwardly in substantial alignment with the slotted opening 22a to contain the processing plate 50 on each side and allow it to slide linearly back and forth and in a level plane through the housing and beneath the forward compartment 22.

A flexible leaf spring member 36 is mounted approximately midway along the inclined inner wall at the back of the lower housing section 20 and made to extend inwardly and downwardly at an angle sufficient to press upon the rearward side of the lower section of lever arm 30 in opposition to the spring-loaded bias that is applied to the grip head 30a in the normal stationary position of the lever arm. This spring force applied by the leaf spring member 36 serves to place the tapered tip portion 30b of the lever arm 30 in a position projecting just inside the plane of travel of processing plate 50 and in direct vertical alignment with the keyway opening 50b at the rear of the processing plate. In this "ready to operate" position, the lever arm 30 and its tapered tip portion 30b is set for immediate engagement with the keyway opening 50b and the resulting reciprocating movement of the processing plate 50 in response to the radial motion of the lever arm. It should be noted that this position of the tip portion 30b allows the processing plate 50 to be fully inserted (with "Top" side up) into the bottom of housing 12 through slotted opening 22a, the backward passage of the processing plate meeting only slight resistance from the tip portion urged forward by the leaf spring 36. With the lever arm 30 resting against the leaf spring 36, the tip portion 30b yields by swinging backward until it aligns with and engages the keyway opening 50b of the processing plate as it slides fully into place within the bottom of the housing 12. When lined up with the keyway opening 50b, the tip portion 30b of the lever arm 30 will suddenly engage and protrude into the keyway opening, effectively latching the processing plate with an audible clicking sound. It is further noted that by rotating the grip head 30a forward slightly from its normal position established by torsion spring 32, the lower section of the lever arm 30 and particularly its tip portion 30b can be moved slightly against the pressure of the leaf spring member 36 to raise the tip portion just above the plane of the processing plate 50 and outside of the keyway opening 50b to allow the plate to be easily removed from the housing 12 through slotted opening 22a.

Referring to FIG. 4 in conjunction with FIGS. 3 and 5, the press head 40 is operatively mounted upon the front panel member 26 of housing 12 with the press head being coupled to a second torsion spring 46, similar in its construction to spring 32, to provide controlled linear movement of the press head through and along slot 26a. The body of the press head 40 is a closed rectangular member in its basic form, having an exterior profile, particularly in its lateral cross section, that is sized to conform and fit closely within the chamber of the forward compartment 22 at the base housing 12 so that it may move longitudinally through the chamber without restriction or jamming. Non-rectangular forms of the press head 40 having curvilinear or cylindrical configurations may also be used subject to the stated conformity of its exterior profile with the chamber of the forward compartment 22. Contoured depressions or cutouts 40a symmetrically formed on either side of the body of the press head 40 are positioned near the top of the press head to better provide for gripping movement of the press head between the forefinger and thumb of the user. Between the contoured depressions 40a on the forward face of the press head 40, a slight boss or raised surface marking may be provided to indicate the area upon which the user may press and trigger the spring-loaded movement of the press head in accordance with the operation of the present food processor device 10. Across the base of press head 40, a ridged or textured bottom surface 40b is preferably formed and provided to secure firm contact and engagement of foodstuff 54 placed within the forward compartment 22 beneath the press head.

The press head 40 is mounted for travel within slot 26*a* and adapted to be retained therein using a rectangular pad member 42 attached to the back of the body of the press head through the slot with the front panel member 26 positioned intimately therebetween. The pad member 42, made of a rigid yet resilient material, such as plastic, is sized, particularly in its width, to span the width of slot 26*a* and is further made in its rectangular dimensions to conform with and fit into a rectangular recess 26*b* formed at the top of the slot on the rear side of the front panel member 26. A detent member 44, similar in material to that of the pad member 42, is affixed to the inner face of the pad member and made to project therefrom in the direction opposite to and away from the front panel 26 and its slot 26*a*. The detent member 44 is formed having a notched configuration that when juxtaposed and affixed to the inner face of the pad member 42, provides a U-shaped slot that serves to engage the torsion spring 46 mounted within the housing 12 at the back side of the front panel member 26.

The torsion spring 46, like that of spring member 32, comprises a coiled main body having a pair of extended legs 46*a* and 46*b* that project in different radial directions from opposite ends of the coiled body. Extended leg 46*a* in this case projects radially from the inward end of the mounted torsion spring 46 in a direction that is substantially upright. In this position, the inward end of the torsion spring 46 and the extended leg 46*a* projected therefrom are fastened to the inner wall of the housing 12 via a mounting plate 47 that supports the extended leg in the upright position and the coiled body of the spring in a level attitude within the housing. The coil body of the torsion spring 46 is mounted axially to the backside of panel member 26 at the side of slot 26*a* and about midway of its length using a fastening post 45 or like rod fastener. The fastening post 45 is sized to fit coaxially through the coil body and is anchored into the panel member 26 substantially perpendicular thereto to maintain the level attitude of the torsion spring 46 and allow its intended movement. The extended leg 46*b* of torsion spring 46 nearest to the panel member 26 is intended for radial movement about the axis of the torsion spring and is biased in its normal projection downwardly from the axially mounted spring coil and forwardly toward the panel member. The length of the extended leg 46*b* is sufficient to reach the ends of slot 26*a* from the mounted position of the coil body of torsion spring 46 and further allow passage through and engagement with the U-shaped slot at the rear of pad member 42 as it moves along the slot in panel member 26. The tip of the extended leg 46*b* is formed having a slight downward radius that helps to maintain its engagement with the U-shaped slot and apply the proper spring bias upon the pad member 42 particularly at the top of slot 26*a*. With the biasing action of the torsion spring 46, best seen in FIG. 4, the extended leg 46*b* is engaged through and upon the U-shaped slot thereby urging downwardly and forwardly upon the pad member 42 and forcing the press head 40 to the bottom of slot 26*a* and the base of the forward compartment 22. It is noted that the forward urging of the extended leg 46*b* continuously presses the pad member 42 into the rear of panel member 26 and thus allows the pad member to engage the recessed section 26*b* at the top of the slot 26*a* under the force of torsion spring 46, as described in greater detail below.

The press head 40 is positionable atop the forward compartment 22 by sliding the head upward along the front panel 26 within slot 26*a*, preferably gripping the contoured depressions 40*a* on either side of head. This sliding motion of the press head 40 toward the top of slot 26*a* is resisted by the downward force exerted by the torsion spring 46 particularly acting through its extended leg 46*b* engaged upon the pad member 42 and associated detent member 44. At the top of slot 26*a*, the forward surface of pad member 42 engages the rectangular recessed section 26*b*, as shown in phantom outline in FIG. 4, with the bottom edge of the tab member resting upon the bottom ledge of the recessed section. This engagement of the pad member 42 with the recessed section 26*b*, urged by the action of the torsion spring 46 and its extended leg 46*b*, locks the press head 40 in its "loaded" position, as seen in FIG. 3, subject to the continued downwardly and forwardly urging spring force applied by the extended leg upon the back side of the pad member. The press head 40 remains "loaded" in its uppermost position as long as the pad member 42 remains engaged within the recessed section 26*b*. While in this "loaded" position, foodstuff 54 can be inserted into the forward compartment 22 beneath the raised level of the press head 40 in preparation for its processing. When the foodstuff 54 is situated and ready for processing, the press head 40 is released by pushing upon its forward surface thereby deflecting the pad member 42 sufficiently rearward to disengage it from the recessed section 26*b*. Once deflected and disengaged, the pad member 42 is driven downward along the slot 26*a* under the urging of the torsion spring 46 and particularly by movement of extended leg 46*b* which rotates downward until the leg returns to its normal position at the bottom of the slot. In so doing, the press head 40 with its ridged bottom surface 40*b* is driven downward along the front panel member 26 and upon the foodstuff 54 in the forward compartment 22, forcing the foodstuff therethrough for processing and discharge from the bottom of housing 12.

Figure 6:
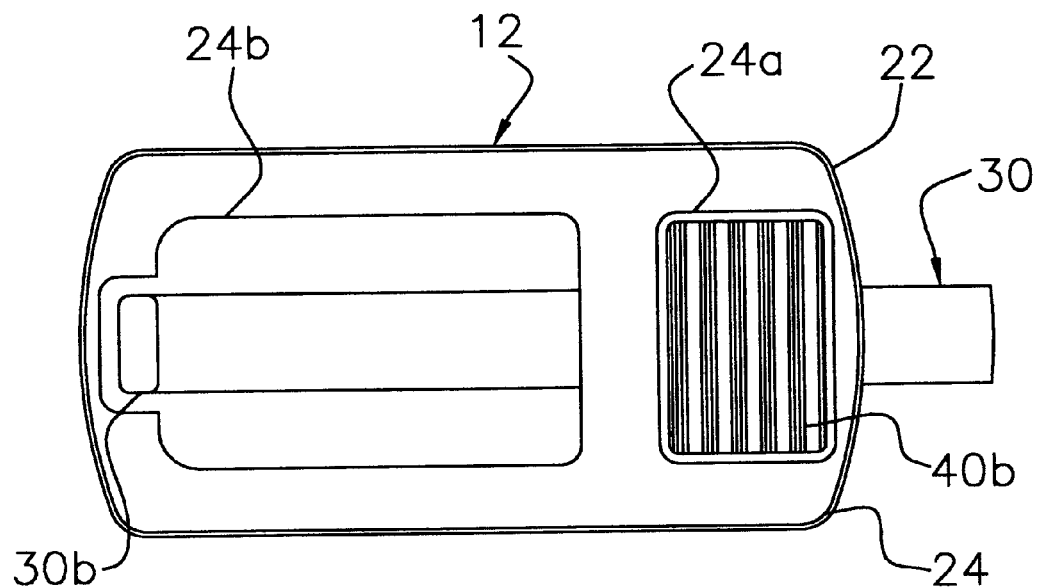
FIG. 6 is a plan view of the bottom of the food processor of FIG. 1.

Referring now to FIG. 6, the base 24 of housing 12 is made to provide a forward opening 24*a* that is aligned with the ridged bottom surface 40*b* of press head 40 and positioned beneath the forward compartment 22. The forward opening 24*a* is sized and shaped to substantially conform with the bottom surface 40*b* the press head 40 in its cross sectional configuration and serves to allow the foodstuff 54 placed in the forward compartment 22 to be passed through the compartment under the force of the spring-driven press head and onto the processing plate 50 reciprocating below. A separate elongated rearward opening 24*b* is further formed in the base 24 of housing 12 and made to extend substantially to the back edge of the housing longitudinally through the central portion of the housing base. The rearward opening 24*b* is generally longer in dimension than the forward opening 24*a* and is preferably shaped in a substantially rectangular configuration as shown in FIG. 6, with sufficient length and width to the opening so as to permit full and unrestricted passage therethrough of the tip portion 30*b* and lower section of lever arm 30 as it moves in a radial course during squeezed actuation of the lever arm 30. The back edge of the rearward opening 24*b* is particularly positioned so as to be aligned with the tapered tip portion 30*b* of the lever arm 30 in its "ready to operate" position, mentioned above, and to provide for immediate engagement between the tip portion and the keyway opening 50*b* of the processing plate 50 when the plate is fully and rearwardly seated in the bottom of the housing 12.

Figure 8:
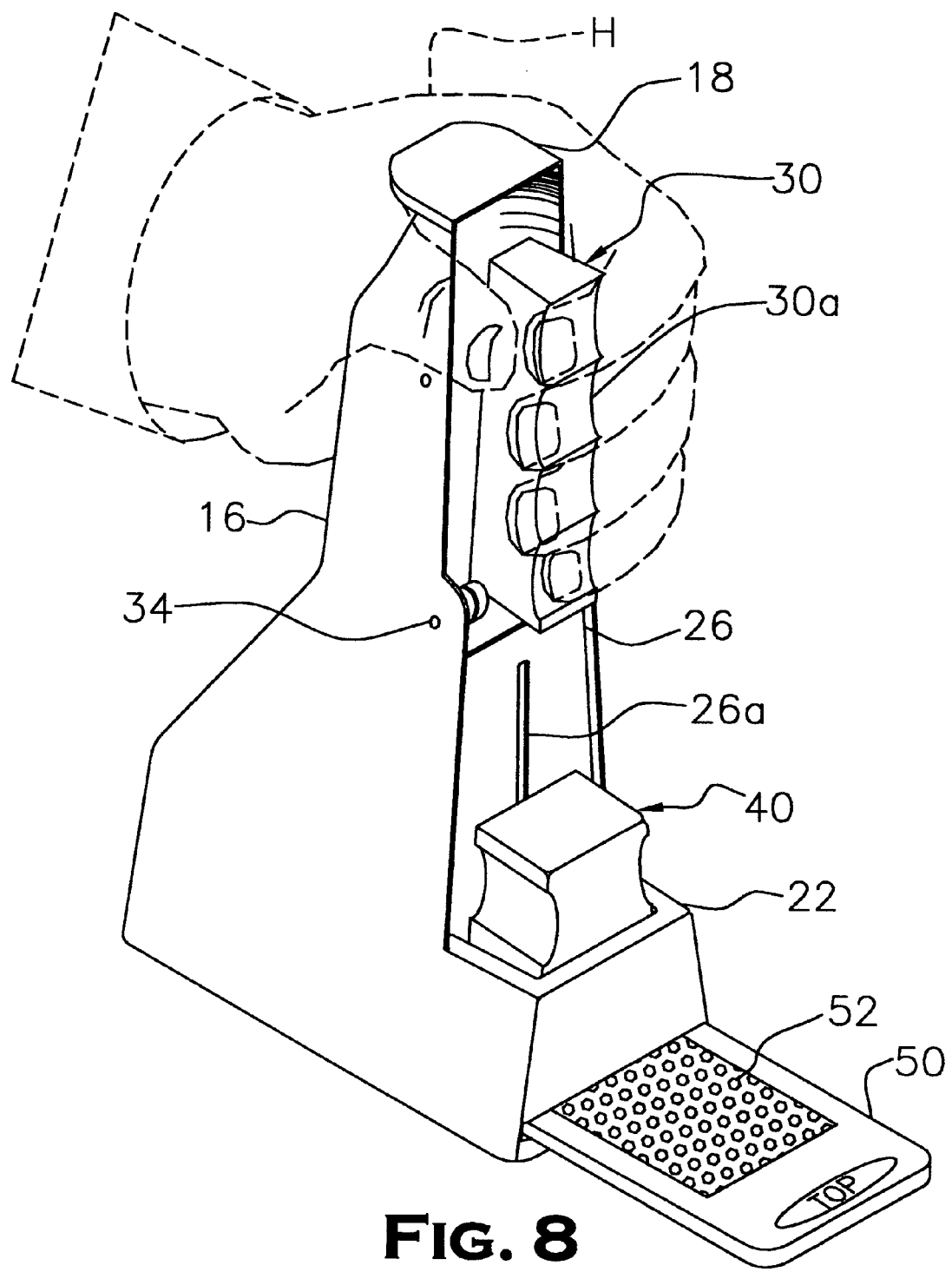
FIG. 8 is a front perspective view, similar to FIG. 1, but showing the food processor device in operational position activated by the hand of a user shown in phantom.
Figure 9:
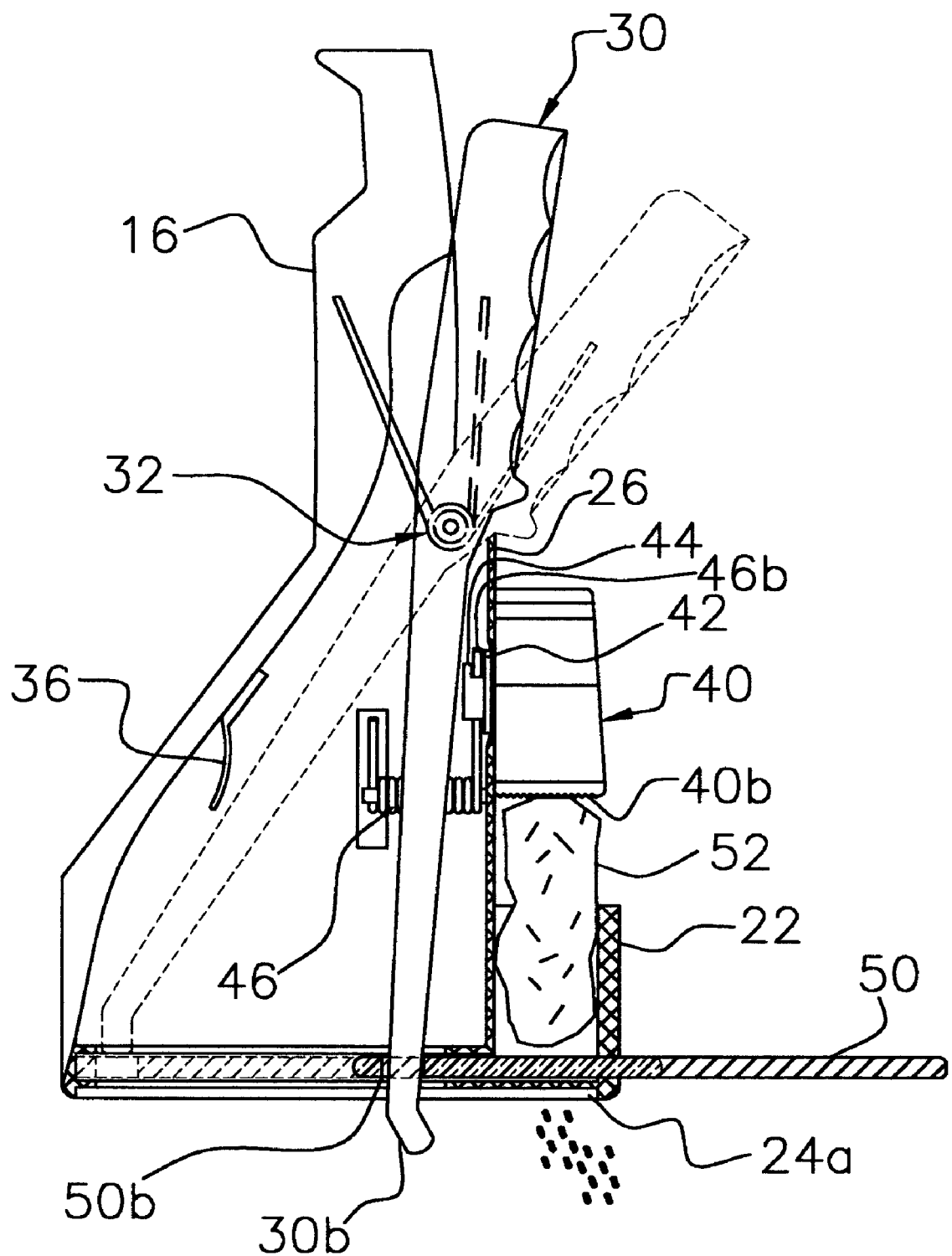
FIG. 9 is a side elevation view of the food processor device with portion cutaway to show operational movement of the device in processing foodstuff loaded therein.

Referring now more particularly to FIGS. 8 and 9 in conjunction with those figures previously discussed, the operation of the present food processor device 10 can be presented accordingly. In the standing position of processor device 10, as seen and described before with respect to FIGS. 1, 3 and 5, lever arm 30 is poised in its "ready to operation" position, (in dotted outline in FIG. 9), press head 40 is locked in its "loaded" position, and operation of the device is ready to proceed as intended by hand. Processing plate 50 with its selected cutting panel 52 contained therein is inserted by the user through forward slot 22a and fully seated to the rear of housing 12 so that the keyway opening 50b is immediately aligned with and partially engaged by the tapered tip portion 30b of the lever arm 30. It should be noted that the cutting panel 52 is selected by the user based upon the type of grating or slicing that is intended to be effected for each particular instance of use of the processor device 10.

The article of foodstuff 54 intended for processing is then placed in the chamber of the forward compartment 22 beneath the "loaded" press head 40, the press head being held in such position by the forwardly directed force of the extended leg 46b of torsion spring 46 that is applied to pad member 42 as it is engaged within the rectangular recessed section 26b on the rear of panel member 26. At this point in the sequence of operation of the present food processor device 10, the foodstuff 54 is resting in the forward compartment over the forward opening 24a in the base 24 of housing 12 and immediately beneath the ridged bottom surface 40b of the press head 40. Pressing slightly upon the forward surface of the press head 40 counteracts the inward exerted spring force applied by extended leg 46b and disengages the pad member 42 from the recessed section 26b to allow the downwardly exerted force further applied by the leg of torsion spring 46 to start the pad member 42 and the press head 40 connected thereto downward along slot 26a with the ridged surface 40b of the press head immediately contacting the foodstuff and pressing it downward in the chamber of forward compartment 22. With the press head 40 released as such from its "loaded" position, the foodstuff 54 beneath in the forward compartment 22 is clamped and urged with a steady force toward the forward opening 24a in the base 24 of housing 12 and directly onto the cutting panel 52 resting immediately beneath in the processing plate 50.

With the foodstuff 54 clamped within the forward compartment 22, the user grips the upper section 14 of the housing 12, placing one hand H (shown in phantom in FIG. 8) with its forefinger and thumb upward about the handle surface 16 just beneath cap member 18 so that the palm of the hand wraps about the outer surface with the fingers extending onto the grip head 30a of the lever arm 30. Gripping upper section 14 of the housing 12 as such, the user then squeezes the fingers of the gripping hand H onto the grip head 30a thus drawing the grip head into the open front end of the upper section against the biasing force of torsion spring 32. As this squeezing action of the hand H is initiated upon the grip head 30a, the lever arm 30 proceeds to rotate about pivot rod 34 and cause the tapered tip portion 30b to move in a radial course immediately into and through the keyway opening 50b on the processing plate 50. Forward travel of the processing plate 50 thus proceeds through the base of housing 12 and outward from slot 22a with the cutting panel 52 making an associated pass on the foodstuff 54 as it is urged downward through the forward compartment 22 by the spring-driven press head 40. With this forward pass of the processing plate 50 and its cutting panel 52 on the foodstuff 54, a grated, sliced or otherwise reduced portion of the foodstuff is produced and discharged from the base 24 of the housing 12 through the forward opening 24a therein. Upon completion of the initial squeezing action of the hand H, as shown in both FIGS. 8 and 9, the grip head 30a is released, while remaining in contact with the fingers of the user, to allow the lever arm 30 to return to its bias position by way of torsion spring 32 and in so doing, to draw the processing plate 50 back into the housing 12 under the continued engagement of the keyway opening 50b by tip portion 30b. This releasing action upon the grip head 30a effects a return pass on the foodstuff 54 by cutting panel 52 to further remove and discharge reduced portions thereof. Repeated squeezing and releasing actions of the hand H on the grip head 30a of lever arm 30 will thus cause the reciprocating passage of the processing plate 50 and its cutting panel 52 through and across the foodstuff 54 loaded into the forward compartment 22 and allow the immediate delivery of sufficient amounts of the foodstuff in its desired form.

Press head 40 will continue to urge the foodstuff 54 through the forward compartment 22 and onto the reciprocating processing plate 50 until the press head reaches the bottom of slot 26a or the press head is returned sooner to its "loaded" position at the top of the slot. Upon completion of any instance of use of the food processor device 10, excess foodstuff 54 may be easily removed from the forward compartment 22 by withdrawing the press head 40 to its original locked position. The processing plate 50 may also be removed from the housing 12 for cleaning or replacement by means of reverse pivoting the lever arm 30 slightly against the leaf spring 36 to left the tip portion 30b completely from the keyway opening 50b and allow the processing plate to be withdrawn from slot 22a.

Therefore, it is apparent that the described invention provides an improved hand-held food processor for cutting, slicing, shredding or grating of foodstuffs. More particularly, the present invention provides an improved food processing device that can be effectively operated by hand to cut, grate or shred a variety of foodstuffs in a wide range of sizes and do so in a portable manner so that the processed foodstuff may be delivered within reach of the user. The described food processor is made to be completely portable in its use and is easy to handle and manipulate during its operation. The present hand-held food processor is particularly lightweight and easy to use, being effective in its operation without need for electrical power. In addition, the described hand-held food processor is simple in construction yet reliable in its operation and is configured for easy storage and cleaning.

Obviously, other embodiments and modifications of the present invention will readily come to those of ordinary skill in the art having the benefit of the teachings presented in the foregoing description and drawings. Alternate embodiments of different shapes and sizes, as well as substitution of known materials or those materials, which may be developed at a future time to perform the same function as the present described embodiment, are therefore considered to be part of the present invention. Accordingly, it is understood that this invention is not limited to the particular embodiment described, but rather is intended to cover modifications within the spirit and scope of the present invention as expressed in the appended claims.

What is claimed:

1. A hand-held food processor device for selectively slicing or grating foodstuff, comprising:
   a housing member formed having an upper handle section and a lower processing section open at the base thereof, said housing member further formed having an open compartment adjacent to the lower processing section for receipt of the foodstuff to be processed;

a processing plate member having a cutting surface contained therein, said processing plate member being removably mounted and slidably disposed for linear movement thereof through the base of the lower processing section of said housing member and reciprocating passage of the cutting surface through the open compartment;

spring-loaded lever means operatively coupled to said housing member and releasably engaged to said processing plate member for actuating by hand the linear movement of said processing plate member and reciprocating passage of the cutting surface through the open compartment; and spring-loaded press means releasably engaged to said housing member in a locked position above the open compartment and slidably disposed for travel therethrough upon disengagement thereof by hand to force the foodstuff through the compartment and onto the cutting surface during reciprocating passage.

2. A hand-held food processor device according to claim 1, wherein said housing member further comprises:

a panel member positioned between the lower processing section and the open compartment, the panel member being formed having a slot extending longitudinally therethrough and a recessed section formed at the top of the slot in the side of the panel member facing the lower processing section.

3. A hand-held food processor device according to claim 2, wherein said spring-loaded press means comprises:

a press head member mounted within the slot forwardly of said panel member for linear travel upward and downward through the open compartment;

a pad member connected to said press head member rearwardly of said panel member, said pad member being formed to fit the recessed section in said panel member to hold said press head member at the top of the slot; and spring means operatively engaged to said pad member for urging said press head member downward through the open compartment.

4. A hand-held food processor device according to claim 3, wherein said press head member is sized in lateral cross section to conform with the open compartment and provided with a ridged surface at the bottom thereof to grip the foodstuff.

5. A hand-held food processor device according to claim 3, wherein said pad member is formed to provide a slotted configuration to engage said spring means.

6. A hand-held food processor device according to claim 5, wherein said spring means comprises:

a torsion spring supported within the lower processing section of said housing member and mounted axially to the panel member, said torsion spring having a coil body and a leg extending radially therefrom to engage the slotted configuration on said pad member.

7. A hand-held food processor device according to claim 1, wherein said spring-loaded lever means comprises:

a lever arm extending substantially through said housing member and pivotally connected thereto, said lever arm being formed having a grip-like section at one end thereof proximate to the upper handle section and a tapered tip at the opposite end proximate to the base of the lower processing section;

a first spring member operatively connected between said lever arm and said housing member to bias the grip-like section of said lever arm outward from the upper handle section of said housing member; and a second spring member mounted within the lower processing section of said housing member and operatively engaged to said lever arm to bias the tapered tip into operative engagement with said processing plate member.

8. A hand-held food processor device according to claim 7, wherein:

said first spring member is a torsion spring having a coil body and a pair of legs extending from opposite ends thereof to flexibly couple the grip-like section of said lever arm to the upper handle section of said housing member; and said second spring member is a leaf spring.

9. A hand-held food processor device according to claim 7, wherein said processing plate member is formed having a keyway opening to engage the tapered tip of said lever arm.

10. A hand-held food processor device according to claim 1, wherein the cutting surface of said processing plate member is selectively determined.

11. A hand-held food preparation device for selectively processing a foodstuff, comprising:

a housing member having a chamber extending longitudinally therethrough, said housing member comprising an upper section formed having a handle surface and a lower section formed having an opening at the base thereof, said housing member further comprising an open compartment forwardly projecting from the lower section to receive the foodstuff to be processed;

a processing plate member having a cutting surface contained therein, said processing member being insertable within the base opening of the lower and slidable section therein to permit reciprocating movement of the cutting surface through the open compartment;

spring-loaded lever means rotatably disposed within the chamber of said housing member and adapted for engagement with said processing plate member to provide reciprocating movement of the cutting surface through the open compartment; and spring-loaded press means releasably engaged to said housing member in a locked position above the open compartment and slidably disposed within the open compartment upon disengagement to force the foodstuff through the compartment and onto the cutting surface during reciprocating movement thereof.

12. A hand-held food preparation device according to claim 11 wherein the open compartment extends upward along the front of said housing member and includes a panel member positioned to separate the open compartment from the chamber of said housing member.

13. A hand-held food preparation device according to claim 12, wherein the panel member is formed having a slot therethrough extending along the open compartment with a recessed section further formed at the top of the slot on the chamber side of the panel member.

14. A hand-held food preparation device according to claim 13, wherein the spring-loaded press means comprises:

a press head member slidably disposed within the slot of said panel member for linear travel upward and downward through the open compartment;

a pad member connected to said press head member on the interior side of the panel member and formed to fit the recessed section therein for holding said press head member at the top of the slot; and a torsion spring operatively connected to said pad member for urging said press head member downward through the open compartment.

15. A hand-held food preparation device according to claim 11, wherein the spring-loaded lever means comprises:
- a lever arm extending substantially through said housing and pivotally coupled thereto to permit rotational movement of said lever arm within the chamber of said housing;
- a first spring member engaged between said lever arm and the upper section of said housing member to bias said lever arm in an operating position; and
- a second spring member mounted within the lower section of said housing member and releasably engaged with said lever arm to bias the lever arm into operative engagement with said processing plate member.

16. A hand-held food preparation device according to claim 15, wherein:
- said lever arm is formed having a grip-like head proximate to the handle surface on said housing member and a tapered tip proximate to the base of the lower housing section in the operating position;
- said first spring member is a torsion spring having a central coil and a pair of legs extending from opposite ends thereof to couple the grip-like head to the handle surface in the biased operating position; and
- said second spring member is a leaf spring.

17. A hand-held food preparation device according to claim 16, wherein said processing plate member is formed having a keyway opening to engage the tapered tip of said lever arm.

18. A hand-held food processor device according to claim 11, wherein the cutting surface of said processing plate member is predetermined based on the processing selected for the foodstuff.

19. A device operated by hand for selectively processing foodstuff, comprising:
- a housing body formed having an upper handle surface and an open base, said housing body being further formed having an open compartment forwardly disposed thereon and extending upward from the open base to receive foodstuff to be processed;
- a processing plate having a preselected cutting surface contained therein, said processing plate being releasably engaged and slidably disposed within the base of said housing body to reciprocate the cutting surface through the open compartment;
- lever means pivotally connected to said housing body and operatively coupled to said processing plate, said lever means being actuated by hand to slide said processing plate through the base with the cutting surface reciprocating through the open compartment; and
- spring-loaded press means releasably engaged to said housing body in a locked position above the open compartment and slidably disposed therethrough upon disengagement by hand for urging foodstuff through the compartment and onto the cutting surface reciprocating therethrough.

* * * * *